Jan. 30, 1923.
G. LAFEVER ET AL.
LOCK NUT.
FILED NOV. 7, 1921.
1,443,751
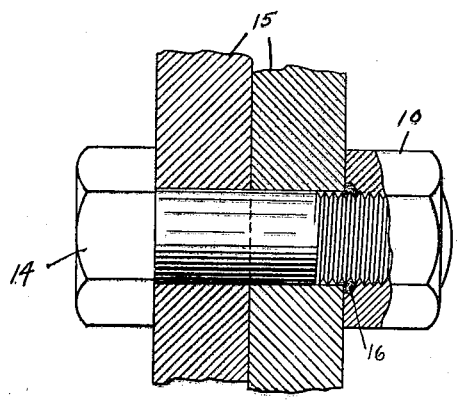
FIG. 1
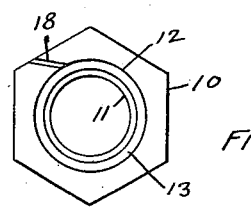
FIG. 2
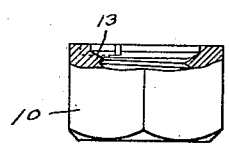
FIG. 3
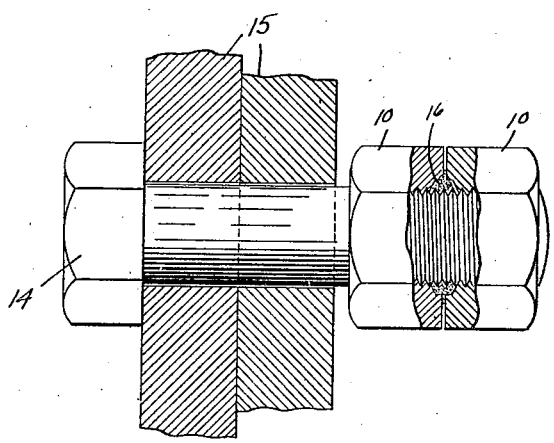
FIG. 5
FIG. 4
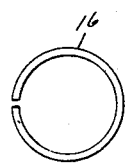
FIG. 6
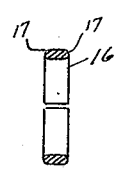
FIG. 7
INVENTORS
GEORGE LAFEVER
BATES E. HAWLEY
BY E.B.Birkenbeuel
THEIR ATTORNEY Patented Jan. 30, 1923.

1,443,751

UNITED STATES PATENT OFFICE.

GEORGE LAFEVER AND BATES E. HAWLEY, OF KELSO, WASHINGTON, ASSIGNORS TO WESTERN SPECIALTY MANUFACTURING COMPANY, OF VANCOUVER, WASHINGTON, A CORPORATION OF WASHINGTON.

LOCK NUT.

Application filed November 7, 1921.  Serial No. 513,321.

*To all whom it may concern:*

Be it hereby known that we, GEORGE LAFEVER and BATES E. HAWLEY, citizens of the United States, and residents of Kelso, in the county of Cowlitz and State of Washington, have invented a new and useful Lock Nut, of which the following is a specification.

This invention relates more particularly to means for locking a nut to a bolt.

The objects of our invention are to provide an exceedingly simple and efficient means for preventing a nut from being lost from vibration or other causes without requiring the use of a special form of bolt or the injuring of the threads by the injudicious use of a wrench upon a locked nut.

In the production of this device we are aware that many forms of lock nuts and washers have been constructed, but find in every case in what appear to be similar devices that the nut and the washer can turn together when being locked, resulting thereby in a tight nut rather than a lock nut. We have therefore constructed a nut which turns independently from its washer when being screwed into place but engages same when any force is exerted to back the nut off.

We accomplish these results in the manner set forth in the following specification and illustrated in the accompanying drawing, in which:

Figure 1 is a sectional view through a nut showing same attached to a bolt. Figure 2 is a plan of a nut from the lock side. Figure 3 is an elevation showing the nut without the washer in place. Figure 4 shows a modified form of constructing the nut. Figure 5 illustrates the nut being used in cases where it cannot be bolted up tight, as in connection with fish plates, etc. Figure 6 is a plan of a washer. Figure 7 is a vertical section through a washer.

Similar numbers of reference refer to the same or similar parts throughout the several views.

Referring in detail to the drawing, we have altered the standard nut 10 by slightly counterboring its threaded hole 11 to the diameter 12 and tapered off the bottom 13 of its counterbore to about seventy degrees with the axis of the bolt 14 which we have illustrated passing through the plates 15. We have constructed a washer 16 of relatively soft flat wire having rounded edges 17.

In Figure 5 we have illustrated the use of two of these nuts with their locked sides adjacent being employed to secure together plates between which a certain amount of play or looseness is to be maintained without the danger of that looseness varying.

It must be understood that the counterbore 12 and the countersink 13 must be extremely smooth and may in some instances even require polishing, although sufficient smoothness may be obtained for all ordinary purposes by the use of high carbon drills properly ground with a very light feed and the application of a good cutting lubricant.

As above suggested, there are a great many varieties of lock nuts and washers now employed in, which the nut and the washer become engaged when being tightened and in reality become a tight nut when turned in either direction, rather than a lock nut which should resist rotation in one direction only. For this purpose we have provided the smooth portions 12 and 13, above referred to, which have a much smaller amount of friction than do the threads of the bolts upon which the soft metal washer 16 becomes embedded when the lock nut is in place. In order to prevent the soft metal washer from remaining on the bolt when it is desired to remove the nut, and also to provide greater resistance to any backing off force we have provided the angular channel 18 which may be milled, forged or produced with a cold chisel, as shown in Figure 4. which will permit the compressed washer to enter the channel 18 and any backing off of the nut 10 would only increase the degree of engagement between the nut and the washer and permit same to offer greater resistance against turning, and at the same time insure the washer following the nut when it is being removed with a wrench.

The use of a flat metal washer which is forced down upon threads by a bolt is of itself not a new thing, and while superior in many mays to other forms of lock nuts its use on a large scale has been prevented by the ever-present fact that its construction tended to unlock rather than lock a nut to a bolt.

The operation of our device is as follows: When desiring to employ one of these devices it is only necessary to insert the washer 16 in the recess 12. The washer 16 being slightly larger than its recess projects somewhat past the face of the nut and encounters the plate 15 earlier than does the nut. Further pressure from the nut merely squeezes the soft metal washer in against the threads without turning same, as is ordinarily the case.

It will be seen in Figure 5, where the two nuts are used together, that it will be necessary to entirely strip the threads which have been formed on the inside of the washer in order to remove the nut nearest the plate 15. It will be understood, however, that in such instances it is not necessary nor desirable to employ the channel 18, as one of the functions of this channel is to assist the nut 10 in rotating the washer 16 in one direction.

When using the nut on any face where the parts are held tightly together place the nut on the bolt with the recess 12 and the washer 16 in contact with the face. Forcing the nut against the face crushes the soft washer into locking position. These conditions require the use of the slot 18 which engages the washer when removing the nut and causes both to come off together.

When using the nut on a bolt in places not permitting a tight or a rigid union such as on motor trucks and machinery where castellated nuts are used, or on fish plates as used on railroads where a certain degree of movement is required, put the nut on without the slot or channel and with the recess and washer outward or away from the fish plate, tighten to the desired firmness and then slip on the soft band or washer 16, holding the nut with a wrench and then put on another plain nut with a smooth surface which comes in contact with the soft washer 16 which is forced by the second nut into the locking position. When crushed into the locking position then remove the outer nut—or in other words, the plain standard nut which was used as a jamb nut to seal the lock. To remove the lock nut so applied, which has a polished recess and no slot or channel to engage the washer, requires the nut to force the soft washer over the rough threads on a stripping principle making the lock nut impervious to jar, stretching of the bolt, or vibration.

In special cases where there is seldom occasion to remove the nuts and where it is imperative to have the nuts stay in place where otherwise the jarring off of the nuts often causes wrecks, breakage and loss, we use two of the recessed nuts on each bolt one without a slot or channel put on with the recess outward or away from the frame and then put on a soft washer of double the usual width and then put on the other nut provided with the channel 18 placed in a manner that the washer is caught between the two recesses when the nuts are forced together.

Being aware of the advancement of this art we do not claim this device broadly but only within the limits set forth in the following claims.

What we claim as new is:

1. A lock nut consisting of a standard nut having one end of its tapped hole counterbored and countersunk, in combination with a soft metal washer having an elongated section with rounded edges, said counterbore face having a channel cut across its face at an angle between its tangent and radius in a manner to cut into said soft washer when nut is backed off.

2. The combination of a bolt, a pair of nuts placed on said bolt with their straight faces adjacent, each of said flat faces having formed therein a shallow, enlarged, polished cavity around its threaded hole and a soft metal washer completely filling both of said cavities and extruding between said nuts. The outer one of said nuts having a means for rotating said washer only when said nuts are backed off.

3. The combination of a bolt with a soft metal washer having a flat cross section and slightly rounded edges with a bolt nut having a smooth recessed cavity adapted to partly receive said washer and having a point projecting from the side of said cavity in a manner that it will slide over said soft metal washer when the nut is tightened and rotatably engage same when the nut is backed off.

GEORGE LAFEVER.
BATES E. HAWLEY